June 28, 1955 W. E. KOCK 2,712,067
METALLIC LENS DIRECTIVE ANTENNA SYSTEMS
Original Filed April 8, 1946 2 Sheets-Sheet 1

E-PLANE PATTERN
OF HORN OF FIG. 1

INVENTOR
W. E. KOCK
H. O. Wright
ATTORNEY

June 28, 1955 W. E. KOCK 2,712,067
METALLIC LENS DIRECTIVE ANTENNA SYSTEMS
Original Filed April 8, 1946 2 Sheets-Sheet 2

INVENTOR
W. E. KOCK
BY
H. O. Wright
ATTORNEY

United States Patent Office 2,712,067
Patented June 28, 1955

2,712,067

METALLIC LENS DIRECTIVE ANTENNA SYSTEMS

Winston E. Kock, Basking Ridge, N. J., assignor to Bell Telephone Laboratories, Incorporated, New York, N. Y., a corporation of New York Original application April 8, 1946, Serial No. 660,338. Divided and this application March 30, 1951, Serial No. 218,354

7 Claims. (Cl. 250—33.63)

This invention relates to directive antenna systems and particularly to radio lenses used in such systems.

This application is a division of my copending application Serial No. 660,338, filed April 8, 1946 which matured into United States Patent 2,562,277 granted July 31, 1951.

As disclosed, respectively, in Patent 2,283,935 (Figs. 16 and 17) to A. P. King and in my copending application Serial No. 642,723, filed January 22, 1946, a flat cellular lens having a uniform thickness and comprising a plurality of guides or cells, and a stepped multiple-zone plano-concave lens having a non-uniform thickness and comprising one or more dielectric channels, have been proposed for focusing radio waves. While the uniform thickness feature of the flat lens may be advantageous in certain systems, the focusing action of this lens is considerably less than that of the plano-concave lens, since the flat lens does not comprise a plurality of zones, whereas the concave lens comprises several zones. Accordingly, it now appears desirable to utilize, for certain purposes, a lens having a uniform thickness and a focusing action fairly comparable to that obtained in the above-mentioned stepped multiple-zone concave lens.

It is one object in this invention, in a flat lens, to obtain a greater focusing action than heretofore secured.

It is another object of this invention, in a line-type feed such as a sectoral horn, to focus the waves in the plane of the long dimension of the feed, in a more satisfactory manner than heretofore accomplished.

It is still another object of this invention to obtain a simple, easily constructed radio lens having a uniform depth or thickness.

In accordance with an embodiment of the invention, the H-plane or so-called $a$ dimension of a single dielectric channel of uniform depth or thickness is tapered, that is, the phase velocity characteristic and hence the refractive index are tapered, for the purpose of securing focusing action.

In accordance with another embodiment, an omniplanar lens having a point focus and a uniform thickness comprises a plurality of dielectric channels. Each channel has a tapered refractive index and the refractive indices of corresponding portions of the channels are tapered or graded.

The invention will be more fully understood from the following description of specific illustrative embodiments taken in conjunction with the drawing on which like reference characters denote elements of similar function and in which.

Figure 2:
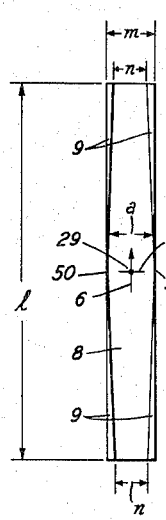
Figs. 1, 2 and 3 are perspective, front and side views, respectively, of one embodiment of the invention comprising a dielectric channel having a tapered refractive index.
Figure 1:
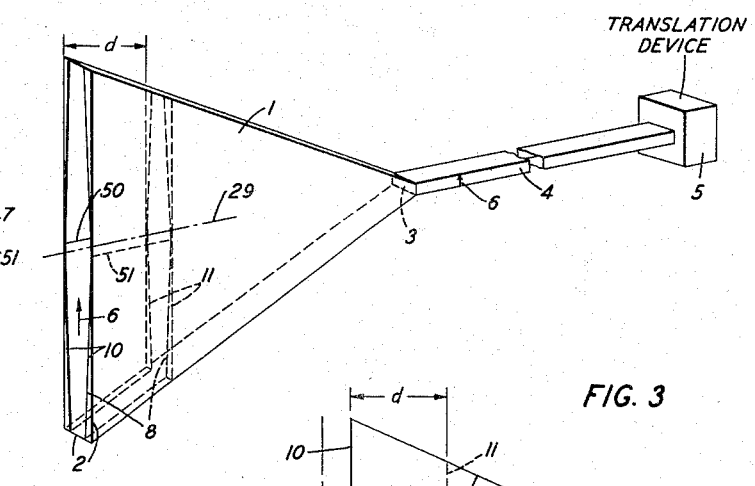
Figure 3:
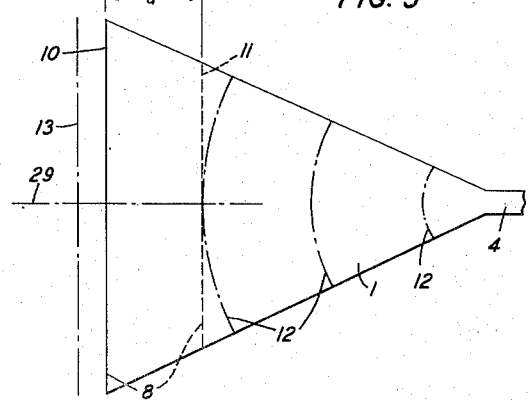

Referring to Figs. 1, 2 and 3, reference numeral 1 denotes a sectoral horn having a mouth aperture 2 and a throat aperture 3, and numeral 4 denotes a guide connecting the throat aperture 3 to a translation device 5 such as a transmitter or reeciver. The horn 1 is flared in the E-plane (vertical direction), represented by the arrows 6 but not in the horizontal direction or H-plane 7. As is universally understood by those skilled in the art, the E-plane of an electromagnetic wave horn or resonator or wave guide or the like, means the dimension parallel to the electric vector of the electromagnetic wave when the device referred to is energized in the manner in which it is normally employed, or in the manner required to produce a stipulated direction of the electric vector. Likewise, the H-plane means the dimension parallel to the magnetic vector of the electromagnetic wave, for conditions of normal use or for a specifically stipulated manner of use. The long and short dimensions of the mouth aperture 2 are denoted by the reference characters $l$ and $m$, respectively. Numeral 8 denotes a dielectric channel, or lens formed in the mouth aperture 2 of the horn 1 by the insertion of the two, doubly wedge-shaped, wall members 9 and the air dielectric medium included therebetween. The wall members 9 are each tapered symmetrically from their respective center lines 50, 51 of Fig. 1, toward both their upper and lower ends, as shown. The depth $d$ of the channel 8 is uniform and both faces 10 and 11, defined as the planes which include the front and rear surfaces of members 9, respectively, of the channel 8 are plane, so that the channel constitutes a flat lens, that is, a lens of uniform depth or thickness from its front to its rear surfaces. As shown on the drawing, the width or $a$ dimension of channel 8 is tapered vertically in both directions from a maximum value $m$ at the mid-point to equal minimum values $n$ at the top and bottom extremities. As shown, the taper is linear, i. e., it follows a straight line law of variation. Hence, and as explained in my copending application, Serial No. 642,723, mentioned above, the phase velocity characteristic and the refractive index of the channel are tapered. The phase velocity of the channel 8, considered in its entirety, is greater than that of free space; and the phase velocity increases from a minimum at the mid-point or widest portion of the channel to a maximum at each end or the most narrow channel portions. In one embodiment actually constructed and tested, the dimensions $l$, $m$, $n$ and $d$, mentioned above, have values in wavelengths, $\lambda_0$, as measured in the air of $6.76\lambda_0$, $0.77\lambda_0$, $0.56\lambda_0$, and $1.54\lambda_0$, respectively, the design wavelength $\lambda_0$ being 3.4 centimeters.

In transmission, waves supplied by device 5 to guide 4 and horn 1 are propagated through the lens 8 and thence radiated. More particularly, as shown in Fig. 3, waves originating at the throat aperture 3 have a circular wave front, represented by the lines 12, in the E-plane. Since the phase velocity is greater at the top and bottom than at the center, the top and bottom portions of the wave front are advanced more rapidly in phase than the central portion so that the lens 8 converts the circular front to a linear wave front 13. In the H-plane, the front of the emergent wave is also substantially linear, so that the outgoing wave front is flat or plane.

Figure 4:
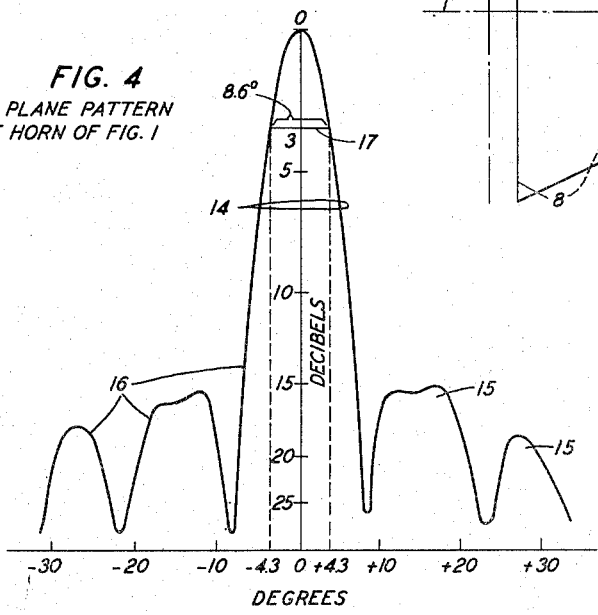
Fig. 4 is a measured directive pattern for this embodiment.

Considered differently, the lens 8 functions to produce in the E-plane a very sharp beam, as shown in Fig. 4. In Fig. 4, numeral 14 denotes the major lobe and numerals 15 denote the minor lobes of the E-plane pattern 16. The major lobe is relatively sharp since its width taken at the half power point 17 is only 8.6 degrees. Also the minor lobes are below fifteen decibels and therefore negligible. Without the lens 8, the beam established by the sectoral horn would be a so-called fan-beam. With the lens 8 in position, a point type beam is established. In reception the converse operation obtains, and the lens focuses the incoming rays on the throat aperture 3.

Figure 5:
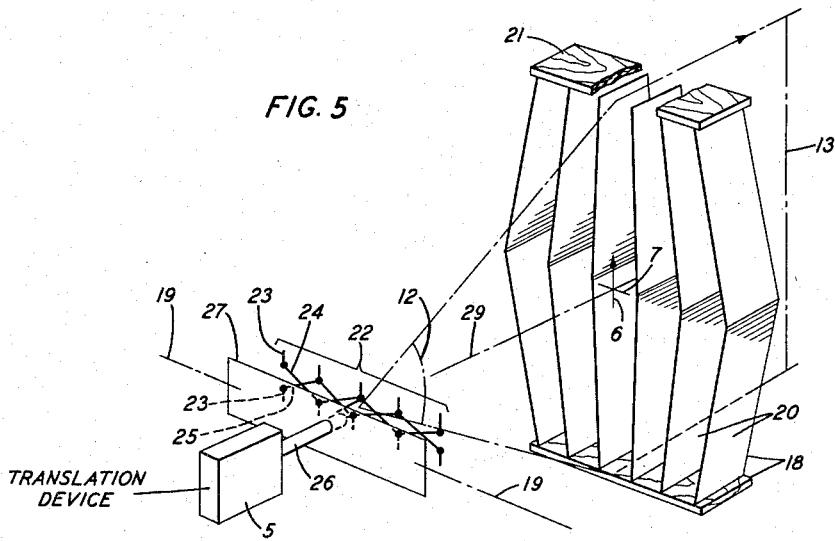
Figs. 5 and 6 are perspective and front views, respectively, of another embodiment of the invention comprising a plurality of channels having similarly tapered refractive indices.
Figure 6:
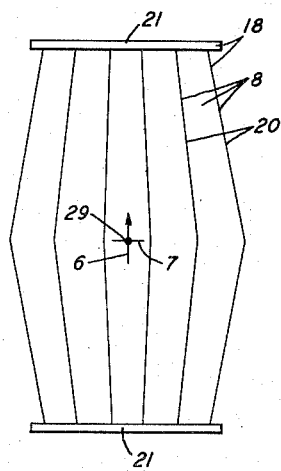

Referring to Figs. 5 and 6, reference numeral 18 denotes a flat quasi-rhombic channel lens comprising a plurality of dielectric channels 8 and having a line focus 19 and an electromagnetic axis 29. Each channel comprises two adjacent plate members 20 and the air dielectric therebetween. The plates 20 are held in position by the wooden members 21. While the channels 8 are each electrically the same as the channel 8 of Fig. 1, the outer channels are bent at the center and the end or narrow channel portions are positioned close together, so as to form a compact structure. Numeral 22 denotes a vertically polarized "line" feed or array aligned with the focal line 19 and comprising the vertical dipoles 23. The dipoles are connected by the transposed conductors 24, 25 and the coaxial line 26 to a translation device 5. Numeral 27 denotes a plane reflector for the array 22.

In transmission, energy is supplied by device 5 over line 26 and conductors 24, 25 to the dipoles 23. The dipoles are energized in phase and establish a wave front which is circular in the E or vertical plane. In this plane the lens 18 functions to convert the circular wave front 12 to a linear front 13, whereby a high degree of directivity is secured. In reception the incoming rays are focused by the lens 18 on the linear array 22 coincident with the focal line 19.

Figure 7:
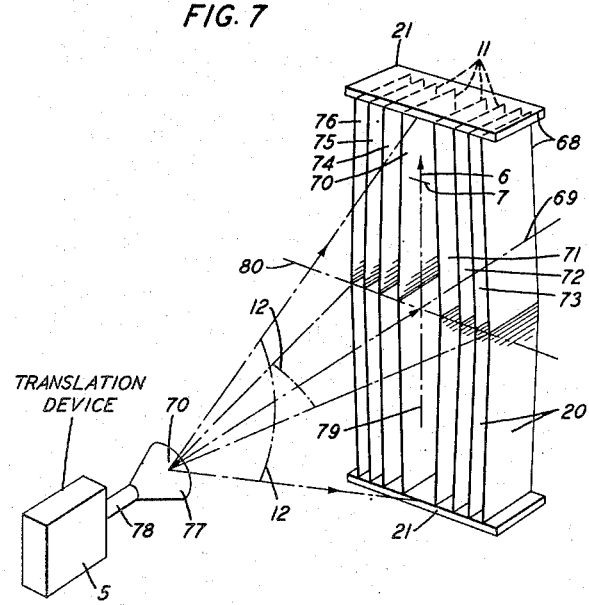
Fig. 7 is a perspective view of another embodiment of the invention comprising a flat channel lens, the channels having different indices and each channel having a tapered index.

Referring to Fig. 7, reference numeral 68 denotes a lens having an axis 69 and a focal point 70 and comprising a plurality of dielectric channels 70, 71, 72, 73, 74, 75 and 76. Numeral 77 denotes a point type horn positioned at the focal point 70 and connected by the guide 78 to the translating device 5. The $a$ dimension of each channel is tapered, as in the system of Figs. 1, 5 and 6, and the indices of the several channels are graded as in the system of my above-mentioned parent application, illustrated, in one specific form, by Figs. 7 and 8 of said parent application. In each channel the maximum refractive index is less than unity and the index at the center of the channel is greater than that at each extremity. Also, proceeding horizontally from the vertical axial plane 78, the maximum $a$ dimensions, and therefore the maximum refractive indices of the channels decrease, and the values of the minimum phase velocities for the channels increase. Similarly, proceeding horizontally from the vertical axial plane 79, the minimum $a$ dimensions decrease and the maximum phase velocities increase; and for intermediate points in the channels above or below, and spaced at equal distances from the horizontal axial plane 80, the $a$ dimensions decrease and the phase velocities increase. As in the lens of Fig. 1, a taper for each channel is selected, by the cut-and-try method, so that the desired focusing in the E-plane 6 is obtained and, as in the system of Figs. 7 and 8 of my above-mentioned parent application, the refractive indices of the several channels are selected so that the desired focusing in the H-plane 7 is secured.

The operation of the system of Fig. 7 is believed to be obvious in view of the discussion given above in connection with Fig. 1 and in my parent application in connection with Figs. 7 and 8 of said application. Briefly, the horn 77 emits a spherical wave front which, by reason of the focusing action of lens 68 in both the H and E-planes, is converted to a plane wave front. In reception, the incoming rays are focused in both planes upon the horn 77.

Numerous and varied other applications of the principles of the invention can readily be devised, by those skilled in the art, within the spirit and scope of the invention. The above-described specific embodiments are illustrative only.

What is claimed is:

1. A lens for high frequency, electromagnetic waves which includes a plurality of plane sheet members having substantially uniform widths and substantially uniform lengths, one set of longitudinal edges of said members lying in and defining a first plane surface, the other set of longitudinal edges of said members lying in and defining a second plane surface parallel to said first plane surface and at a distance from said first surface equal to the width dimension of said members, said members being aligned in a row the spacing between each member and the next adjacent member in the row being a maximum in the transverse plane which includes the lateral center lines of said members, said spacing being tapered and decreasing uniformly from said transverse plane toward both ends of said adjacent members.

2. The lens of claim 1, the tapered spacings between each pair of adjacent members being substantially equivalent.

3. The lens of claim 1, the tapered spacings between the adjacent pairs of said members differing progressively throughout at least one zone, being maximum between the central members of each zone and diminishing in both directions between adjacent successive members along the lateral axis of the assembled lens, the spacings between the outermost members of each zone and their respective adjacent members being of minimum average width in the direction of said lateral axis.

4. In an electromagnetic wave, high frequency, antenna system, the combination which comprises a horn antenna member and an electromagnetic wave lens member, said lens member being positioned to intercept electromagnetic waves leaving or entering said horn antenna member, said lens member comprising at least a pair of plane sheet members having substantially identical widths and substantially identical lengths, one set of longitudinal edges of said members lying in and defining a first plane surface, the other set of longitudinal edges of said members lying in and defining a second plane surface, said first and said second surfaces being parallel to each other and substantially perpendicular to the longitudinal axis of said horn member, said surfaces being spaced apart a distance equal to the common width dimension of said members, said members being spaced from each other a maximum distance in the transverse plane which includes their lateral center lines, the spacing between said members decreasing uniformly from said transverse plane toward both ends of said members.

5. An electromagnetic wave, high frequency antenna comprising in combination a sectoral horn having a pair of plane parallel sides and a pair of plane diverging sides and a dielectric electromagnetic lens mounted in the mouth of said horn, said lens comprising a plurality of conductive wedge-shaped members in the mouth of said horn restricting the opening thereof to a dielectric channel having a length substantially exceeding its width and a substantially uniform depth in the direction of wave propagation therethrough, the width of said channel being tapered from a maximum at the center to minima at the ends of said channel.

6. An electromagnetic wave, high frequency, refractive antenna member which includes a plurality of dielectric channels placed side by side with their longitudinal axes substantially parallel, each of said channels having a length substantially exceeding both its width and its depth, the width of each of said channels being tapered, in which the maximum width of the respective channels is decreased from channel to channel in both directions from the centermost channel throughout at least one group of said channels.

7. A refractor for microwave frequency, electromagnetic waves, said refractor comprising a wave guiding channel defined solely by two similar, spaced, plane, rectangular, conductive members, said channel having a first orifice in a first plane, said first plane including a first longitudinal edge of each of said two conductive members, said first orifice comprising the space between said first longitudinal edges, said channel having a second orifice in a second plane, parallel to said first plane, said second plane including the second longitudinal edge of each of said two conductive members, said second orifice comprising the space between said second longitudinal edges, the opposing surfaces of said conductive members being perpendicular to said first and second planes and approximately parallel to each other, both said conductive members being bent in the vicinity of their respective lateral center lines whereby the separation between said members is a maximum substantially between said lateral center lines and tapers gradually to similar minima between the corresponding extremities of said members.

References Cited in the file of this patent

UNITED STATES PATENTS

| | | |
|---|---|---|
| 2,206,683 | Wolff | July 2, 1940 |
| 2,206,923 | Southworth | July 9, 1940 |
| 2,415,807 | Barrown et al. | Feb. 18, 1947 |
| 2,425,488 | Peterson et al. | Aug. 12, 1947 |
| 2,442,951 | Iams | June 8, 1948 |
| 2,479,673 | De Vore | Aug. 23, 1949 |